Aug. 8, 1950 — E. G. ASHCRAFT — 2,517,825

COFFEE FILTER

Filed Jan. 24, 1947

INVENTOR.

Ernest G. Ashcraft
BY Clarence F. Poole
Atty.

Patented Aug. 8, 1950

2,517,825

UNITED STATES PATENT OFFICE 2,517,825

COFFEE FILTER

Ernest G. Ashcraft, Chicago, Ill.

Application January 24, 1947, Serial No. 724,090

2 Claims. (Cl. 210—162)

This invention relates to improvements in filters especially adapted for use in the siphon type of coffee makers of the vacuum type.

Among the objects of the invention is to provide an improved filter which is simple and economical in construction, which affords a positively controllable degree of filtering action, and which may be more readily cleaned or flushed out than devices heretofore used for a similar purpose.

Further objects and advantages of the invention will appear from time to time as the following description proceeds.

The invention may best be understood by reference to the accompanying drawing in which.

Figure 4:
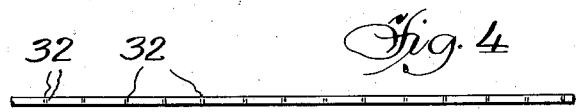
Fig. 4 is a fragmentary detailed view showing a strip of wire before it is coiled to make the filtering spring forming part of my device, and illustrating a method of producing upset projections or spacers along the wire before it is formed into the filtering coil.
Figure 5:
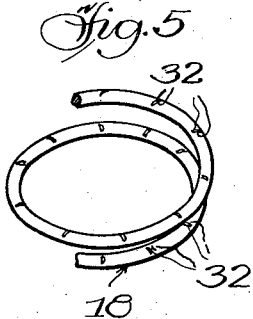
Figure 6:
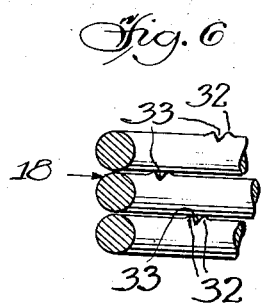

Fig. 5 is a detailed perspective view of the wire shown in Fig. 4 after it has been formed into the helical filtering coil with the spacers disposed between adjacent coils; and Fig. 6 is an enlarged fragmentary detailed view showing in greatly exaggerated scale the projecting spacers between adjacent coils of the filtering spring which serve to provide a circumferentially extending filtering slit of predetermined microscopic width when the filtering coil is compressed during use.

Figure 1:
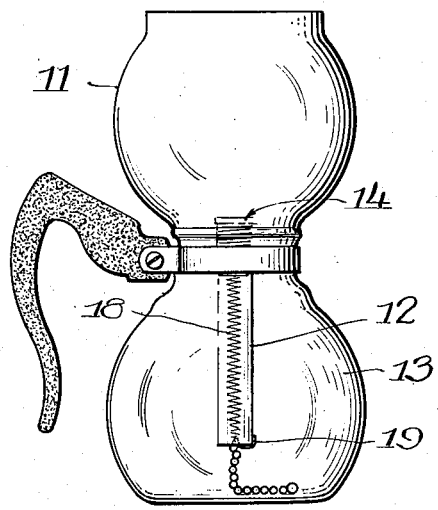
Fig. 1 is a side view of a coffee brewer of a conventional type to which my invention has been applied.
Figure 2:
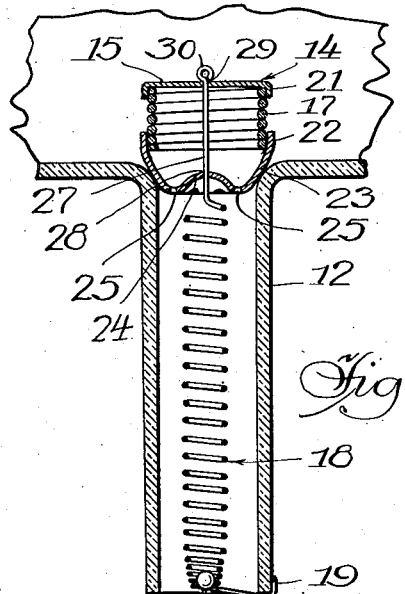
Fig. 2 is an enlarged fragmentary section showing the siphon tube of a coffee brewer with my improved filter device secured therein.

Referring now to the details of the embodiment of my invention shown in the drawings, Figure 1 shows generally a coffee maker of the vacuum type, including an upper container 11 having a siphon tube 12 extending downwardly into a lower container 13. The filter unit of my invention indicated generally at 14 is adapted to be fitted in the upper end of the tube 12 to filter the liquid coffee as it passes downwardly into the lower chamber.

The filter unit consists essentially of a cap member 15, an annular base member 16, a helical filter spring 17 interposed between said cap member and base member, and a coiled holding spring 18 depending from said base member with a hook 19 for engaging the lower end of the siphon tube 12, to secure the filter detachably in the upper end of said tube.

The cap member 15 consists of a disc preferably formed of a suitable non-corrosive metal with a marginal flange 21. The base member 16 consists of a generally cup shaped member, also preferably formed of a non-corrosive metal, with an upright marginal flange 22 at its upper end joined to the downwardly tapered or converging side walls 23, and a bottom wall 24 herein reversely dished at its center and provided with one or more liquid passages 25 therethrough.

The filter spring 17 is of non-corrosive metal, with its coils normally expanded so the adjacent coils are spaced in non-filtering relation with each other. The upper and lower ends of the said filter spring are connected in liquid tight relation to the cap member 15, and base member 16, respectively. In the form shown the end coils of said filter spring are inserted with a press fit within the opposed flanges 21 and 22 of said members, so that the spring cannot become readily displaced from their liquid tight, seated relation therebetween.

The tapered side walls 23 of the base member 16 are arranged to fit with a line contact in the upper end of the siphon tubes of varying diameters when secured therein to form a sealed valve member normally permitting passage of liquid through the liquid passages in the bottom of the said base member.

The coiled holding spring 18 has a straight terminal portion 27 at its upper end which projects upwardly in slidable relation through a central aperture 28 in the bottom of the base member and is suitably connected to the cap member 15, as by passing the end of said terminal portion through an aperture 29 in said cap member and forming an eye 30 above said cap member. While the terminal portion 27 may be, for convenience, slidable in the upper aperture 29, it should fit tightly therein so that said cap member is substantially fluid tight and fluid can only pass into and out of the space between the cap member and base through the filter spring 17.

The filter spring 17 has a plurality of microscopic spacers 32 disposed at regular intervals along and between adjacent coils of the spring, so as to hold the coils apart a predetermined distance, in the order of a few thousandths of an inch and preferably less than two one-thousandths of an inch when the filter spring is compressed to force the coils thereof toward each other. As shown in Figure 4, these spacers may be formed by inserting a series of V-shaped nicks 33 along one side of the length of the spring wire before it is coiled in its helical shape as shown in Figure 5, so that portions of the metal displaced at opposite sides of each nick will be upset to form said spacers. The height of said spacers can be readily controlled by the type of nicking tool and the degree of impact employed.

The filtering spring 17 is of such strength and resilience that its coils will become fully collapsed into filtering relation, held apart only by the spacers 32, 32, before the holding spring 18 is fully expanded into position in which the hook 19 engages the lower end of the siphon tube 11. When the filter coil spring coils are so collapsed, it will be observed that due to the spacers, a substantially continuous filtering slit approximately one thousandth of an inch, and preferably less than two thousandths of an inch is formed between adjacent coils. This microscopic slit extends the full length of the opposed meeting faces of said coils between the cap member and base member 16, as shown in exaggerated form in Figure 6. It will be understood, however, that in the event that excessive steam pressure may be built up in the lower bowl, the filter coils as well as the base member 16 itself, are retained under yielding tension of the holding spring 18, such as to permit relief of such pressure, when necessary.

Figure 3:
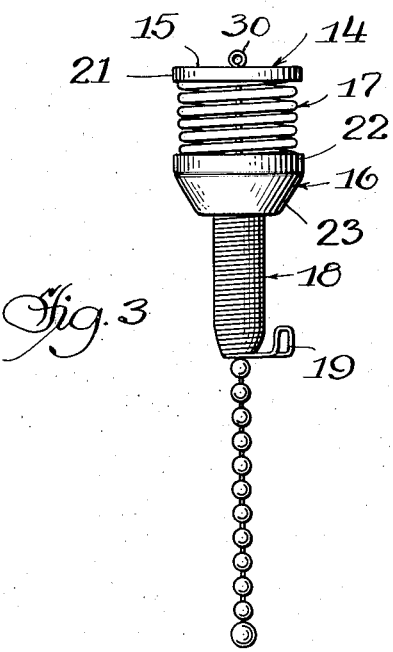
Fig. 3 is a view in side elevation of the filter unit removed from the coffee maker.

When the filter unit is removed from the siphon tube, as shown in Figure 3, the coils of the filter spring 17 will assume their normal expanded, non-filtering position spread apart in open relation to facilitate the cleaning of the unit. Thus the entire unit can be instantly flushed and cleared by running water through the open sides of the filter unit coil, as well as through the bottom of the unit, so as to remove coffee grounds or other matter which otherwise would tend to become lodged under tension in the narrow filtering slit.

Although I have shown and described one embodiment of my invention, it will be understood that various modifications and changes in the structure may be employed without departing from the spirit of my invention, as defined in the appended claims.

I claim:

1. A filter for the siphon tube of a coffee maker, comprising an annular cap member, an annular base member, having downwardly converging sides and a fluid discharge passage through its bottom, a helical filtering spring interposed in end-tight relation between said cap and base member, said filtering spring being normally expanded with its adjacent coils in spaced non-filtering relation, a coiled holding spring having one terminal portion passing freely through said base member and filtering spring, with the upper end of said terminal portion connected to said cap member, said coil spring having means at its lower end for detachably engaging the lower end of a siphon tube to draw the coils of said filtering spring together in filtering relation and to seat said base member under tension in the upper end of the siphon tube, and a plurality of circumferentially disposed spacers formed along the proximate surfaces of the coils of said filtering spring to produce a substantially continuous circumferentially extending filtering slit of predetermined width between said proximate coils when the latter are compressed into filtering relation.

2. A filter for the siphon tube of a coffee maker, comprising an annular cap member, an annular base member having downwardly converging sides and a fluid discharge passage through its bottom, a helical filtering spring interposed in end-tight relation between said cap and base member, said filtering spring being normally expanded with its adjacent coils in spaced, non-filtering relation, a coiled holding spring having one terminal portion passing freely through said base member and filtering spring, with the upper end of said terminal portion connected to said cap member, and said coil spring having means at its lower end for detachably engaging the lower end of a siphon tube to draw the coils of said filtering spring together in filtering relation and to seat said base member under tension in the upper end of the siphon tube, and a plurality of circumferentially disposed upset projections formed along the proximate surfaces of the coils of said filtering spring to produce a substantially continuous circumferentially extending filtering slit of predetermined width between said proximate coils when the latter are compressed into filtering relation.

ERNEST G. ASHCRAFT.

REFERENCES CITED

The following references are of record in the file of this patent:

UNITED STATES PATENTS

| Number | Name | Date |
|--------|------|------|
| 408,487 | Jewell | Aug. 6, 1889 |
| 813,434 | Jones | Feb. 27, 1906 |
| 991,215 | Kuhajda | May 2, 1911 |
| 2,042,537 | Liddell | June 2, 1936 |
| 2,190,965 | Wood | Feb. 20, 1940 |
| 2,234,678 | Matson | Mar. 11, 1941 |
| 2,269,956 | Renner | Jan. 13, 1942 |
| 2,342,669 | Hoffman | Feb. 29, 1944 |
| 2,381,104 | Barnham | Aug. 7, 1945 |
| 2,386,433 | Carter et al. | Oct. 9, 1945 |
| 2,422,647 | Vokes | June 17, 1947 |